June 3, 1958     A. FISHER ET AL     2,837,669
DYNAMOELECTRIC MACHINE
Filed Jan. 3, 1955
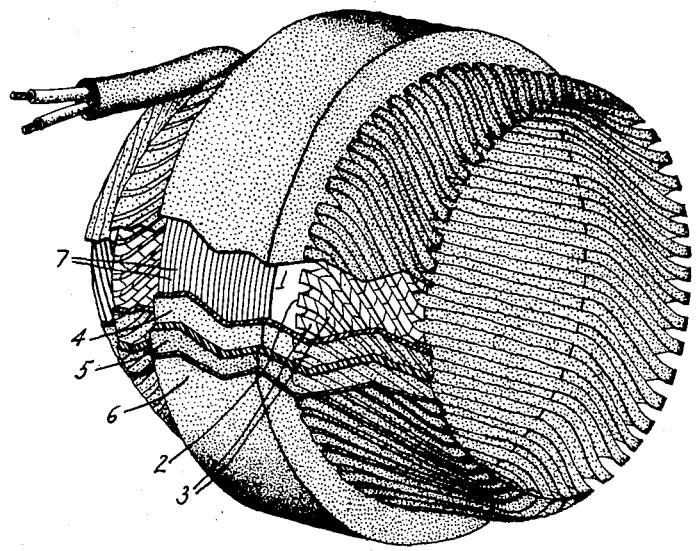
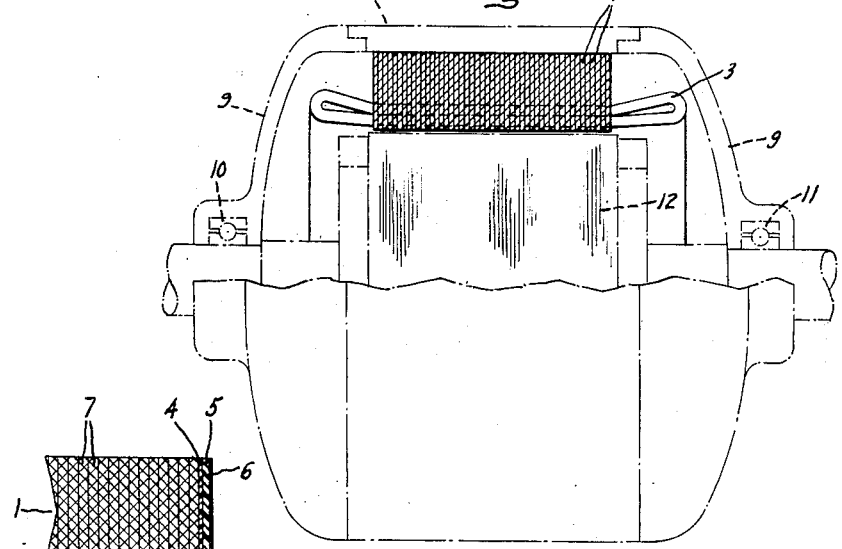
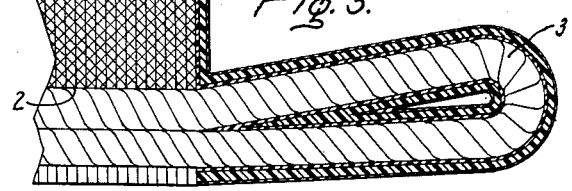
Inventors:
Alec Fisher,
William B. Penn,
by
Their Attorney.

United States Patent Office 2,837,669
Patented June 3, 1958

2,837,669

DYNAMOELECTRIC MACHINE

Alec Fisher, Lynn, and William B. Penn, Marblehead, Mass., assignors to General Electric Company, a corporation of New York Application January 3, 1955, Serial No. 479,274

4 Claims. (Cl. 310—45)

This invention is concerned with electric motors of improved properties. More particularly, the invention relates to a dynamoelectric machine having longer life under conditions of high humidity and salt fog, said dynamoelectric machine comprising a stator including a magnetic core having winding slots therein, the windings in said slots having end turns extending beyond the ends of said core, said stator being coated and impregnated with a dual coating system comprising (1) the cured reaction product of a polyhydric alcohol and a polybasic acid and (2) an outer coating superposed on (1) comprising an air-drying and air-curing methyl polysiloxane resin.

Many applications for electric motors now require operation of the motors under high humidity conditions and under conditions where they will be subjected to salt-containing, that is, sodium chloride-containing, atmospheres. Thus, electric motors used aboard nautical vessels are continuously being subjected to environments which are high in moisture and high in salt content. Under such conditions, it has been found that the usual electric motor, for example, a dynamoelectric machine, deteriorates at an undesirable rate, particularly the insulation in the motor, so that its effectiveness decreases fairly rapidly and thus renders the motor unreliable in service involving such uses. Also, because of improperly protected stator windings, in the above-mentioned atmospheres or environments, undesirable surface leakage may occur with ultimate breakdown of the insulation due to the formation of a low resistance leakage path due to carbonization of the primary insulating coating on the windings.

Various attempts have been made to improve the moisture resistance of such motors and their resistance to salt-containing environments by coating the stators of the motors with various oils and waxes including paraffin waxes, chinawood oil (tung oil), etc. However, such treatments have not been satisfactory because after treatment with the oils or waxes, the surfaces have generally been tacky and therefore have attracted and held any dust which might be contained in the atmosphere so that a water absorbent blanket was formed on what was supposed to be a water-repellent coating. Even treatment of the stator with many of the presently available varnish coatings has not been satisfactory because of the inability of the varnish to impart a highly water-repellent surface. Moreover, before it is possible to obtain any satisfactory degree of water repellency and protection, it is necessary to apply an excessive number, usually four or more, coats to the motor, which coats, in addition to affording insufficient water repellency, increase the size of the motor so that any space saving considerations had to be modified to an undesirable extent. Even the use of silicone rubber for coating purposes is unsatisfactory because of the difficulty of providing thin coatings which are important for maximum heat transfer, and the difficulty of removing the silicone rubber from portions of stator which are advantageously uncoated for minimum air gap.

We have now discovered that a specific type of treatment of a stator used in dynamoelectric machines is able to impart to the latter outstanding resistance to moisture and resistance to salt-containing atmospheres, even at high concentrations of the salt. In accordance with our invention, we employ a two-coat system of specific ingredients which are applied to the stator prior to assembly into the final electric motor. We have found that the desirable properties mentioned above can be obtained by employing as an insulating coating on the stator an oil-modified phenol-aldehyde resinous composition and preferably a resinous composition comprising the reaction product of a polyhydric alcohol and a polybasic acid, which is allowed to cure either by air drying or by the application of heat for short periods of time, and thereafter applying an overcoat of an air-drying organopolysiloxane resin. Each of these treating, that is, coating and impregnating, materials is important in its own right and critical in properties. By means of these specific treatments, it usually requires only two coats, namely, (1) one coat of the polyhydric alcohol-polybasic acid reaction product (hereinafter referred to as "alkyd resin"), which helps to seal any open pores in the insulation of the windings, affords a base for application of the air-drying organopolysiloxane, and also acts as a means of adhering the air-drying organopolysiloxane resin to the stator; and (2) one coat of the air-drying resin, to obtain the desirable improvements in properties. This treatment also prevents the formation of a leakage path over the outside of the insulation on the windings, thus preventing the high potential of the windings from being grounded to the stator core, especially under high humidity or salt-containing atmospheres.

It is essential that the organopolysiloxane resin employed be air-drying, that is, be curable at room temperature in the presence of air. The reasons for this are as follows: In general, organopolysiloxane resins (or rubbers) heretofore employed have required extremely high temperatures of cure for long periods of time. This has been undesirable because the high temperatures required for cure would cause deterioration, such as cracking of the insulation on the winding. In addition, requirements for high temperatures necessitated uses of ovens for long periods of time which introduced an increase in the cost of manufacturing the motor. Finally, because in the curing of organopolysiloxane resins at elevated temperatures, lower molecular weight volatile materials are given off, it often happened that an oven in which such an organopolysiloxane resin was cured became coated with these low molecular weight products and in future operation of the oven for treatment of other types of components, these volatile materials would redeposit on the object being heated in the oven and cause various complications because they acted as release agents which prevented adhesion of other materials to the surfaces of objects which were subsequently treated. It is difficult to clear an atmosphere of these low molecular weight organopolysiloxanes so that one was never sure where they would appear in connection with objects being treated in the oven. Thus, it is apparent if one employed an organopolysiloxane resin of high temperature curing characteristics, the initial treatment with the alkyd resin and baking of the treated stator in an oven in which an organopolysiloxane resin was previously present, would result in inferior adhesion of other resins to the first resinous coating. Obviously, under such conditions it was necessary to use an entirely different set of ovens to heat objects which were previously coated with resinous compositions other than the organopolysiloxane resin. By employing an air-drying organopolysiloxane, these difficulties are readily obviated.

The accompanying drawing with its three figures describes some of the more important embodiments of the invention.

Fig. 1 is a perspective view of a stator showing the various coatings used in the instant invention.

Fig. 2 is a partial sectional view of a dynamoelectric machine illustrating the position of the stator core and windings in the machine.

Fig. 3 is an enlarged fragmentary sectional view of a portion of the stator core and winding found in Fig. 2.

More particularly, Fig. 1 shows a stator core 1 containing winding slots 2 in which electrical windings 3 are positioned. Covering the core and windings is a preferred coating arangement including an initial coating and impregnating resin 4 (e. g., an oil-modified tertiary amyl phenol-formaldehyde condensation product), a second coating 5 (e. g., an oil-modified alkyd resin) deposited on the first coating 4 and an outer coating 6 consisting of an air-drying organopolysiloxane resin, specifically an air-drying methylpolysiloxane resin containing from 1.05 to 1.5 methyl groups per silicon atom. Prior to insertion of the stator into the dynamoelectric machine frame, all coatings on the outer periphery of the stator core are removed to the bare laminations 7 of the core; the resinous coatings on the air gap surface are also removed.

Fig. 2 shows a partial sectional view of a dynamoelectric machine in which the position of the coated stator core 1, together with its coated electrical winding 3, are assembled in a frame 8 having end shields 9 which provide bearings 10 and 11, respectively, for supporting rotor 12 which cooperates electrodynamically with stator 1 to constitute a dynamoelectric machine. The coatings used in the practice of the present invention are not delineated but are more specifically shown in Fig. 3.

Fig. 3 is an enlarged fragmentary view to show in better detail a portion of Fig. 2 wherein the peripheral surfaces of the laminations 7 of the stator core 1 are shown free of the resinous coatings, while the individual layers comprising the initial coating 4, the intermediate oil-modified alkyd resin coating 5, and the air-drying organopolysiloxane resin 6 are clearly shown on the sides of the stator core and on the winding 3 enclosed in a slot 2.

The essential base coat applied to the stator comprises a reaction product of a polyhydric alcohol and a polybasic acid, either with or without modification as, for instance, modified with oils, phenol-aldehyde resins, rosin, etc. Examples of polybasic acids (or anhydrides) which may be used in the manufacture of the aforesaid alkyd resins are oxalic, malonic, succinic, adipic, azelaic, phthalic, halogenated phthalic acids; isophthalic acid, terephthalic acid, adducts of hexachlorocyclopentadiene and maleic anhydride, etc. Examples of polyhydric alcohols (dihydric, trihydric, etc.) which may be used in the formulation of the above-mentioned alkyd resinous compositions are ethylene glycol, diethylene glycol, propylene glycol, glycerine, sorbitol, pentaerythritol, etc. Monohydric alcohols, for example, those boiling above 150° C., such as alkyl ethers of glycols, for instance, alkyl ethers of ethylene glycol, etc., may also be used for modification purposes.

The modifying ingredient may comprise modifying oils in the raw, heated, or blown state which may be employed in making the modified alkyd resins, for example, linseed oil, chinawood oil, castor oil, soyabean oil, oiticica oil, linseed oil acids, cocoanut oil acids, palmitic acid, stearic acid, oleic acid, etc. The amount of the modifying ingredients may be varied within wide limits, for example, from about 5 to 70 percent, preferably from 10 to 60 percent of the total weight of the modifying ingredient, the polyhydric alcohol and the polybasic acid or acids present in the reaction mixture. Techniques for making these above-mentioned resinous compositions are readily available in the art. These resins are advantageously dissolved in a suitable solvent, such as petroleum spirits, xylene, liquid aliphatic hydrocarbons, butanol, aliphatic acylates, for instance, amyl acetate, etc., wherein the alkyd resin comprises from 10 to 60 percent or more of the total weight of the latter and the solvent. Curing agents or driers such as cobalt naphthenate, iron octoate, iron naphthenate, etc., are advantageously incorporated in the alkyd resin solution to accellerate the cure of the latter. Usually, from 0.1 to 0.8 percent drier, based on the weight of the resin, is generally sufficient for the purpose.

In addition to the above-mentioned alkyd resins, modification of the alkyd resin may also take place with phenol-formaldehyde resins, in which the phenol may, if desired, contain alkyl groups on the aromatic nucleus, for instance, butyl groups, amyl groups, etc. In addition to modification with phenol-formaldehyde resins, one may also use other aldehydes such as furfural, acetaldehyde, etc., in making the phenolic resins used for modification purposes. The phenolic resins used may themselves be modified with any of the various oils described above, especially where the phenolic resin contains alkyl groups in the aromatic residue of the phenol. The presence of rosin modification of the phenolic resin is not precluded.

The air-drying organopolysiloxane employed in the practice of the invention is extremely critical and must conform to certain requirements. The air-drying organopolysiloxane resins found most suitable in the practice of the present invention comprise a methylpolysiloxane obtained by cohydrolyzing with water, on a weight basis, from 75 to 95 percent methyltrichlorosilane and from 5 to 25 percent dimethyldichlorosilane, the hydrolysis of the mixture of methylchlorosilanes being effected in a hydrolysis medium comprising water, a higher alcohol such as secondary butyl alcohol, and an aromatic hydrocarbon such as xylene or toluene. The hydrolysis product is thereafter separated from the acidic layer, washed with water to reduce the acidity, and thereafter dissolved in a solvent such as an aromatic solvent of the type described above and bodied at room temperatures or somewhat elevated temperatures with an alkaline bodying agent such as an alkali-metal hydroxide (e. g., sodium hydroxide, potassium hydroxide, cesium hydroxide, etc.) until a viscosity of about 200 to 1500 centipoises is obtained. Thereafter the alkaline condensing agent is neutralized, for instance, with a small amount of acetic acid, the reaction product filtered and thereafter adjusted to a solids content of about 5 to 20 percent with additional solvent such as xylene so as to give a good dipping solution. In the hydrolysis step of the methyltrichlorosilane and dimethyldichlorosilane, small amounts up to 5 percent, by weight, of the entire mixture, of organochlorosilanes, such as phenyltrichlorosilane, diphenyldichlorosilane, methyl phenyldichlorosilane, etc., may be tolerated, although for optimum results it is preferred that the organic groups attached to silicon by carbon-silicon linkages be all methyl groups, and that there be about 1.05 to 1.5 total methyl groups per silicon atom.

The manner whereby the stator (that is, the magnetic laminations and the windings) may be treated in accordance with the practice of the present invention is relatively simple. The stator is first heated, for instance, at about 150° C., for about one hour to drive off all moisture, and thereafter the stator is dipped in a varnish such as an oil-modified alkylated phenolic varnish to bond the components more securely, this again being advantageously followed by a bake at about 150° C. for about one hour. Thereafter, the coated stator is dipped in the alkyd resin solution (which is advantageously at a concentration of about 10 percent resin solids), the coated and impregnated stator is removed, and the resin is cured in an oven at a temperature of from about 125° to 150° C. for a time sufficient to effect satisfactory cure, e. g., for about one-half to one hour. The cured resin-coated stator, preferably while still at an elevated temperature, is immersed in the organopolysiloxane resin solution advantageously maintained at a resin solids content of about 5 to 20 percent. The stator coated with the second coating is then removed and allowed to drain preferably while revolving the stator to insure even coating of the stator. The ultimately desired cure of the organopolysiloxane can be effected by permitting the coated stator to air-dry at room temperature (around 20° to 35° C.) for about one to three hours or more. In general, we have found it advantageous to apply the alkyd resinous coating to a thickness of the organopolysiloxane resin is extremely small, advantageously of the order of about 0.1 to 1 mil, for maximum heat transfer. The outer periphery of the laminations of the stator core and the inner periphery or air gap surface of the stator core are cleaned to the bare metal and the stator is then assembled in the frame together with the rotor to form the electrical motor or dynamoelectric machine. Alternatively, the outer periphery of the stator core and the air gap surface can be masked prior to the above treatments, thus obviating the necessity of the cleaning operation.

In order that those skilled in the art may better understand how the present invention may be practiced, the following examples are given by way of illustration and not by way of limitation. The type of motor employed for test purposes is particularly described in AIEE Transactions, vol. 71, part III (paper 52–57), pages 251–253 and is an improved and accepted equipment for testing and evaluating motor insulations under AIEE–IC. The salt fog test employed for evaluating the effectiveness of the coatings on the stator was carried out as follows: The water was placed in a closed chamber into which an atomized spray of a 2 percent solution of sodium nitrite was injected and maintained for the entire period of test. The top coils in the slots of the test motor were connected to one phase, while the bottom coils were connected to a second phase, and the frame of the test motor was connected to a third phase of a standard 3-phase 220 volt line. The test motor was energized for 3 minutes out of each 10 minutes in an on-off cycle to impart electrical surges without enough time of current flow to warm up the coils to the extent of drying them of the absorbed and condensed moisture. Minute meters and fuses to each phase permitted the recording of the time of failure. In the following examples all parts are by weight.

*Example 1*

An alkyd resin was prepared by co-reacting 975 parts glycerine, 260 parts ethylene glycol, 2271 parts phthalic anhydride, 298 parts soya fatty acids, 747 parts oiticica oil, and 1955 parts rosin, employing the usual methods of making alkyd resins. This resinous product was dissolved in a solvent comprising xylene and VM and P naphtha to a resin solids content of about 60 percent. A cobalt naphthenate drier was added in an amount equal to 0.25 percent of the resin solution.

*Example 2*

A methylpolysiloxane resin was obtained by hydrolyzing a toluene solution of a mixture of ingredients comprising, by weight, about 90 percent methyltrichlorosilane and 10 percent dimethyldichlorosilane, by adding the toluene solution to a hydrolyzing medium composed of water, secondary butyl alcohol and an additional amount of toluene. After hydrolysis, the methylpolysiloxane resin, in the form of a toluene solution, was separated from the water layer, washed until substantially all the hydrochloric acid had been removed, adjusted to about 35 percent solids (in toluene) and thereafter partially bodied with a small amount (about 0.08 percent, by weight, of the resin) of potassium hydroxide at room temperature until a viscosity of 200–500 centipoises was obtained. The resinous solution thus obtained was adjusted with additional toluene to form a 10 percent resin solids solution. The preparation of such an air-drying resin may be found disclosed in U. S. Patent 2,383,827.

*Example 3*

A test motor comprising a magnetic core and windings (hereinafter for brevity referred to as "test motor") was immersed in the alkyd resin described in Example 1, removed and allowed to drain for about 30 minutes and thereafter heated at about 160° C. for approximately four hours to effect curing of the alkyd resin. While the motor was still hot after the above curing step, it was immersed in the air drying methylpolysiloxane resin described in Example 2, removed, allowed to drain and thereafter permitted to remain at room temperature for a time (about 12 to 16 hours) sufficient to attain a non-tacky, cured state. The thickness of the alkyd resin coating was approximately 5 to 6 mils while the thickness of the methylpolysiloxane resin was of the order of about 0.1 to 1 mil in thickness.

Similar test motors as employed above were given other treatments. In one instance, a test motor was dipped in the alkyd resin of Example 1 and cured, and then dipped in a linear methylpolysiloxane oil of about 100 centipoise viscosity, such a composition being more particularly disclosed in Patnode Patent 2,469,890. This latter treated test motor was thereafter air-dried similarly as the first treated test motor.

Another test motor was dipped in the above-mentioned glyceryl-phthalate alkyd resin of Example 1, cured similarly as above and thereafter dipped in an 8 percent methyl phenylpolysiloxane resin solids solution obtained by cohydrolyzing a mixture of ingredients comprising, by weight, about 48 parts phenyltrichlorosilane, 28 parts diphenyldichlorosilane, 31 parts of a blend of methyltrichlorosilane and dimethyldichlorosilane, employing hydrolysis and solvation conditons similar to those used in making the air-drying methylpolysiloxane resin described in Example 2. In this latter instance, the test motor treated with the methyl phenylpolysiloxane resin was heated at an elevated temperature to effect satisfactory cure after the initial treatment with the alkyd resin and cure of the latter.

Finally, a test motor was dipped in the alkyd resin of Example 1 and cured at elevated temperatures similarly as above without any other treatment being given to the coated stator.

Each of the above-treated test motors was thereafter subjected to the above-mentioned salt fog test to determine the average life of each motor under the test conditions. The results of these tests were as follows. The motor dipped in the alkyd resin and thereafter dipped in the air-drying methylpolysiloxane resin did not fail until 95.5 hours in the salt fog test. In contrast to this, the motor coated with the alkyd resin and thereafter treated with the methyl phenylpolysiloxane resin failed in about 42 hours; the motor treated with the alkyd resin and thereafter with the linear methylpolysiloxane failed in about 35.1 hours; while the motor dipped in the alkyd resin alone failed in about 6.4 hours.

It will, of course, be apparent to those skilled in the art that other primer coatings may be used in place of the specific alkyd resin recited above without departing from the scope of the invention, many examples of which have been disclosed previously. The use of an additional subcoat before the alkyd resin coat, e. g., a soya oil-modified formaldehyde-t-amylphenol condensation product is advantageously used. The concentration of the alkyd resin and the curing conditons may be altered as required.

In addition to the air-drying methylpolysiloxane used in the foregoing example, other air-drying methylpolysiloxanes may be employed, keeping in mind the specific requirements for such resins, and the desirability of bodying the resin before use.

Dynamoelectric machines having stators coated and impregnated as described above are useful in high humidity environments and especially in environments which are high in salt content as, for instance, for use on naval ships where contact with salt water and salty air constitutes a severe test of the ability of a motor to operate efficiently and without undue deterioration for long periods of time.

While the above invention has been shown in connection with a stator for a dynamoelectric machine, it is apparent that the treatment is applicable to the wound rotors and stators of all types of dynamoelectric machines.

What we claim as new and desire to secure by Letters Patent of the United States is:

1. A dynamoelectric machine comprising a stator including a core having winding slots therein, windings in said slots having end turns extending beyond the ends of said core, said stator being coated and impregnated with a dual coating system comprising (1) a cured reaction product of a polyhydric alcohol and a polybasic acid and (2) an outer coating superposed on (1) comprising an air-cured methylpolysiloxane resin.

2. A stator for a dynamoelectric machine including a core having winding slots therein, windings in said slots having end turns extending beyond the ends of said core, said stator being coated and impregnated with a dual coating system comprising (1) a cured reaction product of a polyhydric alcohol and a polybasic acid and (2) an outer coating superposed on (1) comprising an air-cured methylpolysiloxane.

3. A dynamoelectric machine comprising a stator including a stator core having winding slots therein and windings in said slots having end turns extending beyond the ends of said core, said end turns being coated and impregnated with a dual coating system comprising (1) the cured reaction products of a mixture of an oil-modified glyceryl-phthalate resin and (2) an outer coating superposed on (1) comprising an air-cured methylpolysiloxane resin containing an average of from about 1.05 to 1.5 total methyl groups per silicon atom.

4. A member for a dynamoelectric machine comprising a core formed of magnetic material and a winding associated with said core for electromagnetic cooperation therewith, said winding being impregnated with (1) an insulating coating and (2) an outer coating comprising an air-cured methylpolysiloxane resin.

References Cited in the file of this patent

UNITED STATES PATENTS

| | | |
|---|---|---|
| 1,827,571 | Fiene | Oct. 13, 1931 |
| 2,414,525 | Hill et al. | Jan. 21, 1947 |
| 2,516,030 | Swiss | July 18, 1950 |
| 2,618,757 | Wieseman et al. | Nov. 18, 1952 |
| 2,626,223 | Sattler et al. | Jan. 20, 1953 |

FOREIGN PATENTS

| | | |
|---|---|---|
| 698,605 | Great Britain | Oct. 21, 1953 |